Jan. 1, 1935.  F. KONN  1,986,639
STRAIGHT LINE MOTOR
Filed Oct. 4, 1934
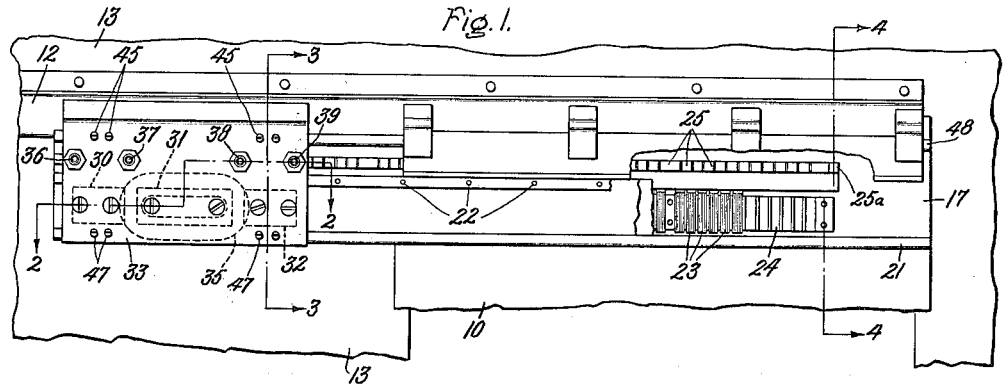
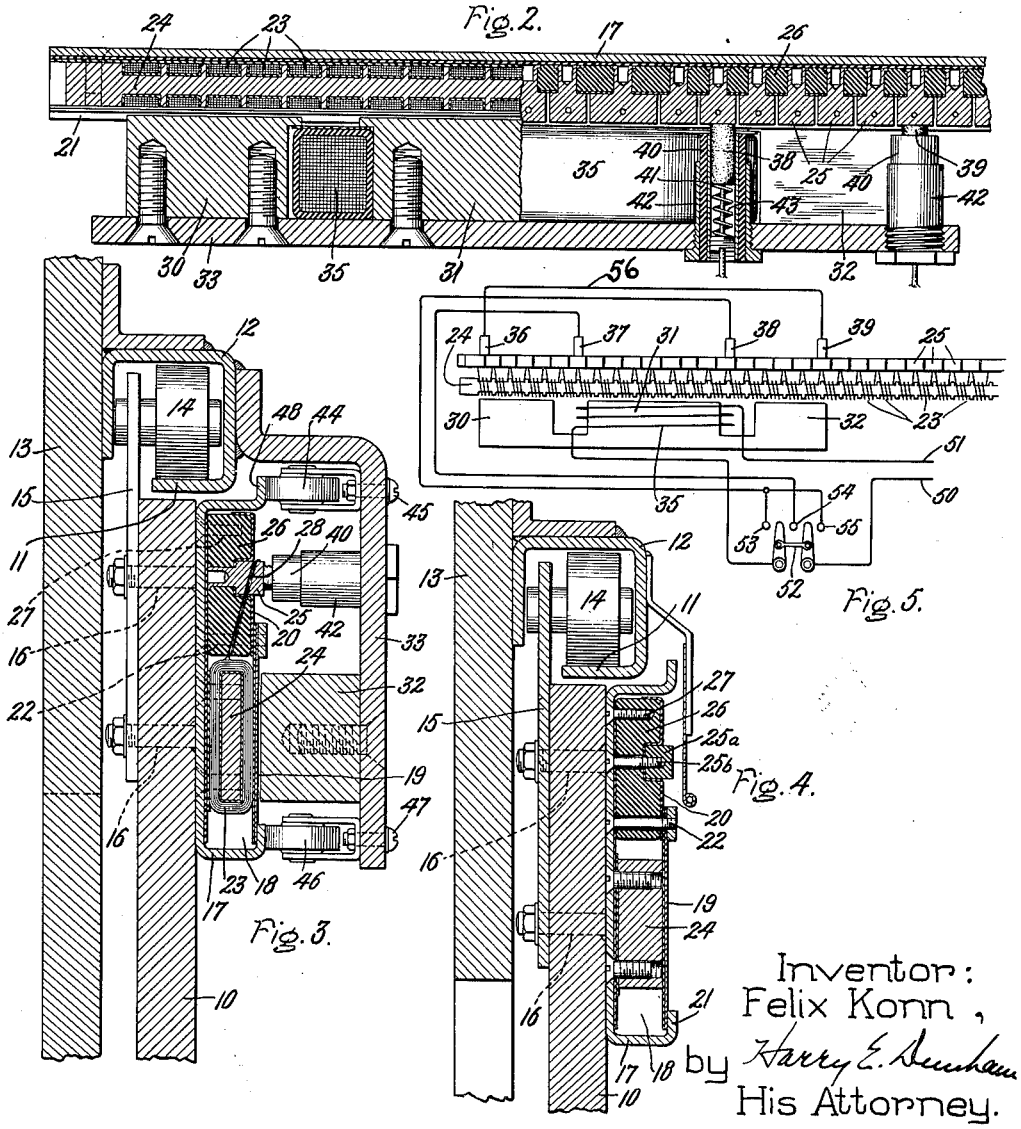
Inventor:
Felix Konn,
by Harry E. Dunham
His Attorney.

Patented Jan. 1, 1935

1,986,639

UNITED STATES PATENT OFFICE 1,986,639

STRAIGHT LINE MOTOR

Felix Konn, Erie, Pa., assignor to General Electric Company, a corporation of New York Application October 4, 1934, Serial No. 746,809

14 Claims. (Cl. 172—290)

My invention relates to rectilinear electric motors.

It is often desirable to provide power operated devices for opening and closing doors of street cars or the like in order that they may be controlled from a relatively remote point and in order that the speed of movement of the doors may be increased even when the doors are relatively heavy. A rectilinear door motor has the advantage that the rectilinear armature of such a motor may be mounted along the top of the door adjacent its cooperating stationary field structure so that they do not obstruct the doorway or occupy usable space. Rectilinear motors of the commutator type, that is, those having an elongated commutator extending longitudinally of the armature thereof, are particularly useful for the purpose described because of the long travel which may be attained therewith.

It is an object of my invention to provide a rectilinear motor having a compact armature provided with a plurality of coils and an elongated enclosing casing therefor.

It is a further object of my invention to provide a rectilinear motor of the commutator type which is provided with an improved arrangement for guiding the armature and its commutator with respect to the cooperating current collecting brushes.

Further objects and advantages of my invention will become apparent as the following description proceeds and the features of novelty which characterize my invention will be pointed out with particularity in the claims annexed to and forming a part of this specification.

For a better understanding of my invention, reference may be had to the accompanying drawing in which Fig. 1 is a front elevation of a motor embodying my invention applied to a sliding door; Fig. 2 is a sectional view along the line 2—2 of Fig. 1; Fig. 3 is a sectional view taken along the line 3—3 of Fig. 1; Fig. 4 is a sectional view taken along the line 4—4 of Fig. 1, and Fig. 5 is a diagrammatic view showing the electrical connections of the armature and field winding of the motor shown in Fig. 1.

Referring to the drawing, I have shown a motor embodying my invention used to operate a door 10, which is carried on a track 11 formed by a longitudinal flange on a channel 12 which is secured to the door frame 13. The door 10 is supported on the track 11 by rollers 14 secured to straps 15 attached to the side of the door by studs 16 which are secured to a backing plate 17 of armature 18 of the motor, the latter being located on the opposite side of the door. The armature 18 of the motor is thus fastened directly to the front of the door 10 by the studs 16 which extend through the latter and the armature transmits force directly to the door.

The rectilinear armature 18 comprises an enclosing casing made up of a channel-shaped backing plate 17 and retaining plates 19 and 20. The retaining plate 19 is held in position along its lower longitudinal edge by an upwardly extending flange 21 on the backing plate 17 and along its upper longitudinal edge by bolts 22. A series of coils 23 wound on a magnetizable core member 24 are held in position within the enclosing casing of the armature 18 against the backing plate 17 by the retaining plate 19. As shown in Fig. 2, the coils 23 are distributed transversely along the armature 18 and as best shown in Fig. 5 are connected in series through the commutator segments 25. The commutator segments 25 are mounted in a block of bakelite or other insulating material 26 which is in turn secured to the backing plate 17 by screws 27 and bolts 22, the front of the insulating block being covered by the retaining plate 20. Insulating retaining blocks 25a are held in position at the ends of the row of commutator segments by screws 25b. The end connections 28 of the coils 23 extend through the insulating block 26 from the coils to the commutator segment 25, as best shown in Fig. 3. It is desirable that the active portion of the armature be thin and of uniform thickness. This object is attained in armatures constructed in accordance with my invention as described above by arranging the active sides of the armature coils 23 transversely of the armature within the enclosing casing made up of the backing plate 17 and the retaining plates 19 and 20.

The armature 18 extends transversely of a field magnet having pole pieces 30, 31 and 32 secured to a depending vertical plate 33 which is in turn secured to the channel 12. The field magnet includes an energizing coil 35 surrounding the central or main pole piece 31 thus producing a magnetic field with the main pole in the pole piece 31 and resultant poles in the pole pieces 30 and 32.

Four brushes 36, 37, 38 and 39 are mounted on the depending plate 33 in holes formed therein. The brush 38, as best shown in Fig. 2, is mounted in an insulating sleeve 40 which is provided with an internal bearing sleeve 41 and an external supporting sleeve 42, the latter being externally threaded to the depending plate 33. The brush 38 is held in engagement with the commutator segments 25 by a compression spring 43. The remaining brushes 36, 37 and 39 are provided with similar mountings and are arranged opposite the boundaries of the magnetic poles created by the field magnet. A pair of horizontally aligned rollers 44 is secured to the depending plate 33 by screws 45 above the field magnet and a similar pair of aligned rollers 46 is secured to the supporting plate 33 by screws 47 below the field magnet. The pairs of rollers 44 and 46 engage the bearing surfaces on the armature formed by flanges 48 and 21 on the upper and lower edges of the backing plate 17, respectively. The multi-point guiding arrangement formed by the pairs of rollers 44 and 46 thus serves to guide the armature 18 with respect to the brushes and maintains a uniform air gap between the armature and field magnet.

The force exerted by the motor is obtained by the reaction of the armature conductors opposite the field magnet and the flux which passes from the main pole piece 31 to the pole pieces 30 and 32. The motor may be energized by either alternating or direct current from a source connected to the conductors 50 and 51 shown in Fig. 5. The energizing coil 35 of the field magnet is connected in series with the coils 23 of the armature by a reversing switch 52; the motor may also be open circuited by this switch when the latter is placed in the mid-position as illustrated. By moving the reversing switch 52 to the left to close contacts 53 and 54 the motor is energized for movement of the armature in one direction and upon moving the reversing switch to the right closing contacts 54 and 55, the motor is energized for movement of the armature in the opposite direction. The outside brushes 36 and 39 are permanently connected together by conductor 56. These brushes do not perform any commutation duty, but they complete a circuit between the ends of the active portions of the armature and they thereby provide two balanced paths in the armature. The armature may be made of any length required for the desired length of travel without any increase in energy loss since the brushes 36 and 39 cut out of circuit all but the active portion thereof.

Although I have shown a particular embodiment of my invention, I do not desire to be limited to the exact construction described and I intend in the appended claims to cover all modifications which do not depart from the spirit and scope of my invention.

What I claim as new and desire to secure by Letters Patent of the United States, is:

1. A rectilinear motor comprising a field magnet, a rectilinear armature extending transversely thereof, said armature having an enclosing casing and a winding comprising a plurality of coils within said casing, and means for supporting and guiding said armature with respect to said field magnet.

2. A rectilinear motor comprising a field magnet, a rectilinear armature extending transversely thereof, said armature having an enclosing casing, and a winding having a plurality of coils within said casing, the sides of said coils carrying current in the same direction being distributed transversely along said casing, and means for supporting and guiding said armature with respect to said field magnet.

3. A rectilinear motor comprising a field magnet, a rectilinear armature extending transversely thereof, a winding for said armature comprising a plurality of coils, the sides of said coils carrying current in the same direction being distributed transversely along said armature, means including plates on either side of said coil sides for retaining said coil sides in position, and means for supporting and guiding said armature with respect to said field magnet.

4. A rectilinear motor comprising a field magnet, a rectilinear armature extending transversely thereof, a winding for said armature having a plurality of coil sides distributed transversely along said armature, means including a plate having a surface adjacent said field magnet and an opposite surface adjacent said coil sides for retaining said coil sides in position, and means for supporting and guiding said armature with respect to said field magnet.

5. A rectilinear motor comprising a field magnet, a rectilinear armature extending transversely thereof and including a plate having a surface adjacent said field magnet, a winding for said armature comprising a plurality of series connected coils distributed over the other surface only of said plate and retained thereby, said winding having a plurality of coil sides distributed transversely along said armature, and means for supporting and guiding said armature with respect to said field magnet.

6. A rectilinear motor comprising a field magnet, a rectilinear armature extending transversely thereof, said armature having an enclosing casing provided with a longitudinal bearing surface thereon and a winding comprising a plurality of coils within said casing, and means including a roller engaging said bearing surface on said armature casing for supporting and guiding said armature with respect to said field magnet.

7. A rectilinear motor comprising a field magnet, a rectilinear armature extending transversely thereof, said armature having a backing plate provided with a longitudinal flange and a plurality of coils carried by said backing plate, and means including a roller engaging said flange on said backing plate for supporting and guiding said armature with respect to said field magnet.

8. A rectilinear motor comprising a field magnet, a rectilinear armature extending transversely thereof, said armature having an enclosing casing including a backing plate provided with a longitudinal flange, a plurality of coils supported on said backing plate adjacent said field magnet, a retaining plate secured to said coils and to said backing plate on the side of said coils adjacent said field magnet, and means including a roller engaging said flange on said backing plate for supporting and guiding said armature with respect to said field magnet.

9. A rectilinear motor comprising a stationary supporting member having a depending plate portion and a field magnet secured thereto, a rectilinear armature extending transversely of said field magnet, said armature having a backing plate provided with a longitudinal flange, a plurality of coils carried by said backing plate, a commutator extending longitudinally of said armature, means for supporting and guiding said armature with respect to said field magnet, and a plurality of current collecting brushes supported on said stationary supporting member in contact with said commutator.

10. A rectilinear motor comprising a stationary supporting member having a depending vertical plate portion and a field magnet secured thereto, a rectilinear armature extending transversely of said field magnet, a plurality of longitudinal bearing surfaces on said armature, and means for guiding and supporting said armature with respect to said field magnet including rollers supported on said stationary supporting member above and below said field magnet for engagement with said longitudinal bearing surfaces on said armature.

11. A rectilinear motor comprising a stationary supporting member having a depending vertical plate portion and a field magnet secured thereto, a rectilinear armature extending transversely of said field magnet, a plurality of longitudinal bearing surfaces on said armature, and means for guiding and supporting said armature with respect to said field magnet including a pair of horizontally aligned rollers above said field magnet and a second pair of horizontally aligned rollers below said field magnet, all of said rollers being supported by said stationary supporting member for engagement with said longitudinal bearing surfaces on said armature.

12. A rectilinear armature comprising a plate, a winding for said armature comprising a plurality of series connected coils distributed over one surface only of said plate, and means including said plate for retaining said coils in position.

13. A rectilinear armature, a winding for said armature comprising a plurality of coils the sides of said coils carrying current in the same direction being distributed transversely along said armature, and means including plates on either side of said coil side for retaining said coil sides in position.

14. A rectilinear armature comprising an enclosing casing and a winding having a plurality of coils within said casing, the sides of said coils carrying current in the same direction being distributed transversely along said casing.

FELIX KONN.